(12) United States Patent
Watanabe et al.

(10) Patent No.: US 11,188,217 B2
(45) Date of Patent: Nov. 30, 2021

(54) ELECTRONIC APPARATUS, INFORMATION PROCESSING METHOD, PROGRAM, AND STORAGE MEDIUM

(71) Applicant: CANON KABUSHIKI KAISHA, Tokyo (JP)

(72) Inventors: Kazuhiro Watanabe, Tokyo (JP); Yuko Hokari, Tokyo (JP); Tomoki Wada, Kawasaki (JP); Akane Sakamoto, Tokyo (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/243,909

(22) Filed: Jan. 9, 2019

(65) Prior Publication Data

US 2019/0212891 A1   Jul. 11, 2019

(30) Foreign Application Priority Data

Jan. 11, 2018   (JP) .............................. JP2018-002605
Jan. 12, 2018   (JP) .............................. JP2018-003484

(51) Int. Cl.
*G06F 3/048*   (2013.01)
*G06F 3/0486*  (2013.01)
*G06F 3/0488*  (2013.01)
*H04N 5/232*   (2006.01)
*G06F 3/01*    (2006.01)

(52) U.S. Cl.
CPC ........ *G06F 3/0486* (2013.01); *G06F 3/04883* (2013.01); *H04N 5/23216* (2013.01)

(58) Field of Classification Search
CPC .............. G06F 3/0486; G06F 3/04883; H04N 5/23216
See application file for complete search history.

(56) References Cited

U.S. PATENT DOCUMENTS

| 7,728,818 | B2 * | 6/2010 | Yu ....................... G06F 3/04883 345/172 |
| 8,146,021 | B1 * | 3/2012 | Asente ................ G06F 3/04883 715/863 |
| 8,302,021 | B2 * | 10/2012 | Dettinger .............. G06F 3/0486 715/769 |
| 8,427,445 | B2 * | 4/2013 | Kennedy ............. G06F 3/04883 345/173 |
| 8,610,678 | B2 * | 12/2013 | Ikeda .................. G06F 3/04883 345/173 |
| 9,852,261 | B1 * | 12/2017 | Havard .................. G16H 10/60 |

(Continued)

*Primary Examiner* — Nicholas Augustine
(74) *Attorney, Agent, or Firm* — Canon U.S.A., Inc. IP Division

(57) ABSTRACT

An electronic apparatus includes a specifying unit configured to specify a position on a display unit, a selection unit configured to select a candidate item displayed on the display unit, and a control unit configured to perform control in such a manner that, if the specifying unit specifies a position of a first item corresponding to a first function that is displayed on the display unit after the candidate item is selected, the selected candidate item is moved from a position different from the first item to the position of the first item while spending a predetermined time or longer, and the first function is executed when the selected candidate item is moved to the position of the first item.

17 Claims, 10 Drawing Sheets

(56) References Cited

U.S. PATENT DOCUMENTS

| | | | |
|---|---|---|---|
| 2003/0011632 A1* | 1/2003 | Gupta | G06Q 30/02 |
| | | | 715/747 |
| 2004/0141010 A1* | 7/2004 | Fitzmaurice | G06F 3/04886 |
| | | | 715/810 |
| 2007/0273666 A1* | 11/2007 | Shin | G06F 3/04883 |
| | | | 345/173 |
| 2007/0273668 A1* | 11/2007 | Park | G06F 3/04883 |
| | | | 345/173 |
| 2008/0084400 A1* | 4/2008 | Rosenberg | H04N 21/422 |
| | | | 345/173 |
| 2008/0295015 A1 | 11/2008 | Liu et al. | |
| 2009/0138800 A1* | 5/2009 | Anderson | G06F 3/04883 |
| | | | 715/702 |
| 2010/0251152 A1* | 9/2010 | Cho | G06F 3/0482 |
| | | | 715/765 |
| 2010/0299638 A1* | 11/2010 | Choi | G06F 3/0488 |
| | | | 715/835 |
| 2011/0010619 A1* | 1/2011 | Brown | G06F 3/04883 |
| | | | 715/702 |
| 2011/0016390 A1* | 1/2011 | Oh | G06F 3/0486 |
| | | | 715/702 |
| 2011/0055753 A1* | 3/2011 | Horodezky | G06F 3/04883 |
| | | | 715/810 |
| 2011/0061021 A1* | 3/2011 | Kang | G06F 3/0488 |
| | | | 715/800 |
| 2011/0107275 A1* | 5/2011 | Kuo | G06F 3/038 |
| | | | 715/856 |
| 2013/0033525 A1* | 2/2013 | Markiewicz | G06F 3/04883 |
| | | | 345/684 |
| 2013/0067392 A1* | 3/2013 | Leonard | G06F 3/0486 |
| | | | 715/784 |
| 2020/0097090 A1* | 3/2020 | Yoo | G06F 3/04817 |

* cited by examiner

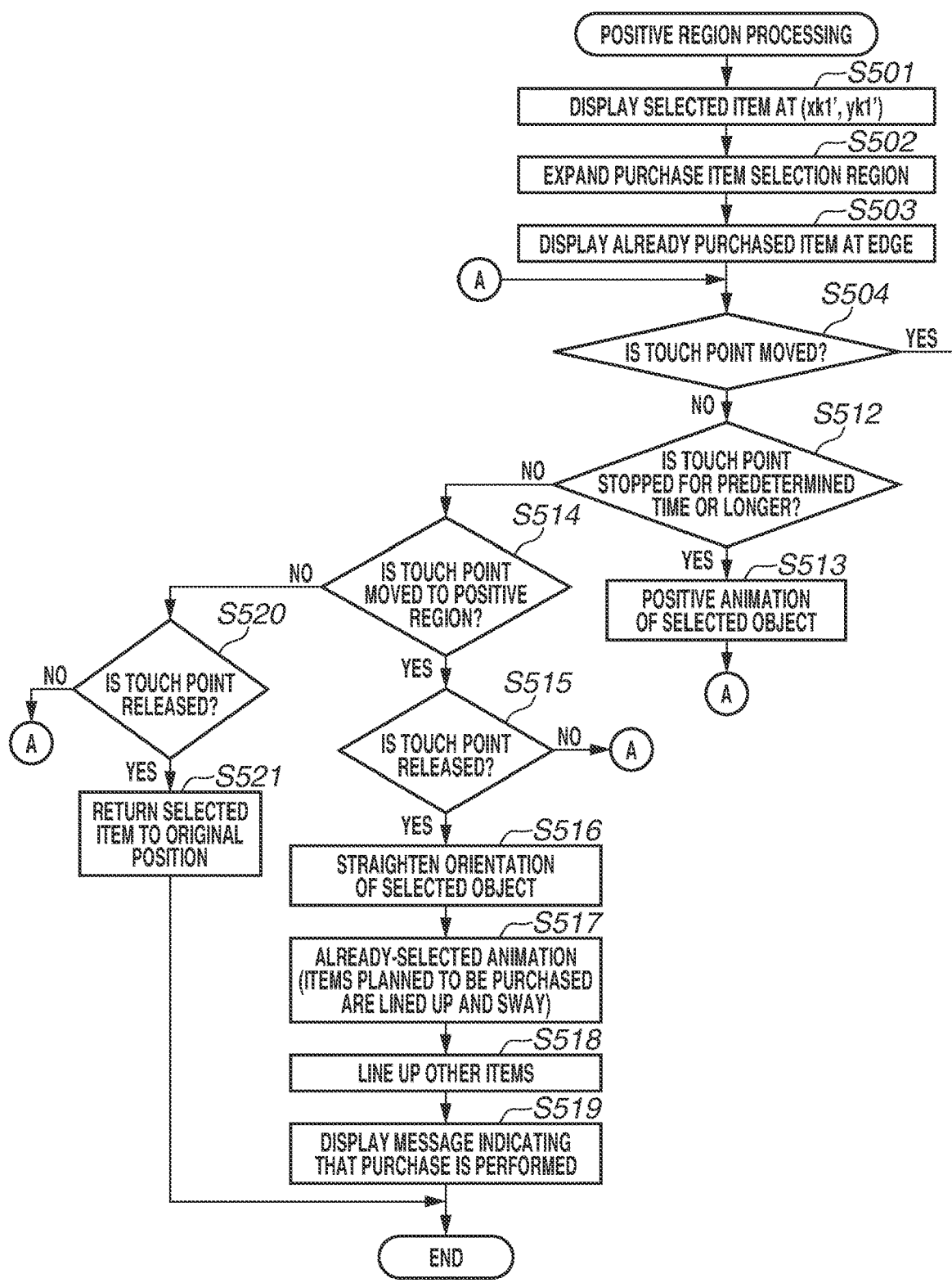

FIG.6

COORDINATES OF POSITIVE ICON
$(\alpha, \beta)$
COORDINATES OF NEGATIVE ICON
$(\gamma, \omega)$

[POSITIVE REGION]
DISTANCE $\geq$ l(S509)
$(xk, yk) \rightarrow (xk', yk')$
$xk > \alpha \rightarrow (xk - d)$
$xk \leq \alpha \rightarrow (xk + d)$
$yk > \beta \rightarrow (yk - a)$
$yk \leq \beta \rightarrow (xk + a)$ DISTANCE < l(S511)
$(xk, yk) \rightarrow (xk', yk')$
$xk > \alpha \rightarrow (xk - d*(L/l))$
$xk \leq \alpha \rightarrow (xk + d*(L/l))$
$yk > \beta \rightarrow (xk - a*(L/l))$
$yk \leq \beta \rightarrow (xk + a*(L/l))$

[NEGATIVE REGION]
DISTANCE $\geq$ l(S315)
$(xk, yk) \rightarrow (xk', yk')$
$xk > \gamma \rightarrow (xk + d)$
$xk \leq \gamma \rightarrow (xk - d)$
$yk > \omega \rightarrow (yk + a)$
$yk \leq \omega \rightarrow (xk - a)$ DISTANCE < l(S316)
$(xk, yk) \rightarrow (xk', yk')$
$xk > \gamma \rightarrow (xk + (2d - d*(L/l)))$
$xk \leq \gamma \rightarrow (xk - (2d - d*(L/l)))$
$yk > \omega \rightarrow (yk + (2a - a*(L/l)))$
$yk \leq \omega \rightarrow (yk - (2a - a*(L/l)))$

ELECTRONIC APPARATUS, INFORMATION PROCESSING METHOD, PROGRAM, AND STORAGE MEDIUM

BACKGROUND OF THE INVENTION

Field of the Invention

The present invention relates to an electronic apparatus that executes a function on an item, a control method, and a program.

Description of the Related Art

There is a method that, when executing a function according to a user instruction, sets a time period for confirming whether the user is sure that he wants to execute this function instead of executing the function immediately when the instruction is issued from the user first. United States Patent Application Publication No. 2008/0295015 discusses a technique which assigns a plurality of functions to a button, and a different function is executed according to a time during which the button is kept pressed. The Publication No. 2008/0295015 discusses displaying a time indicator that indicates a time taken until each function is executed.

The method discussed in United States Patent Application Publication No. 2008/0295015 causes the user to wait until the function is executed while viewing the time indicator, thereby making the user feel that he has been waiting for a long time. Further, the user cannot readily understand which function will be executed until the user has actually waited. On the other hand, if nothing is indicated to the user, it becomes impossible for him to figure out when the function will be executed.

SUMMARY OF THE INVENTION

Embodiments of the present invention are directed to improving operability in executing a function in the case where the instruction to execute the function from the user continues for a predetermined time or longer.

According to embodiments of the present invention, an electronic apparatus includes a specifying unit configured to specify a position on a display unit, a selection unit configured to select a candidate item displayed on the display unit, and a control unit configured to perform control in such a manner that, in a case where the specifying unit specifies a position of a first item corresponding to a first function that is displayed on the display unit after the candidate item is selected, the selected candidate item is moved from a position different from the first item to the position of the first item while spending a predetermined time or longer, and the first function is executed when the selected candidate item is moved to the position of the first item.

Further features of the present invention will become apparent from the following description of exemplary embodiments with reference to the attached drawings.

BRIEF DESCRIPTION OF THE DRAWINGS

FIG. 3, which includes

FIG. 5, which includes FIG. 5A and FIG. 5B, is a flowchart illustrating purchase control processing.

FIG. 6 illustrates a display position of a selected item.

DESCRIPTION OF THE EMBODIMENTS

In the following description, exemplary embodiments of the present invention will be described with reference to the drawings.

In the following description, a first exemplary embodiment of the present invention will be described with reference to the drawings.

Figure 1A:
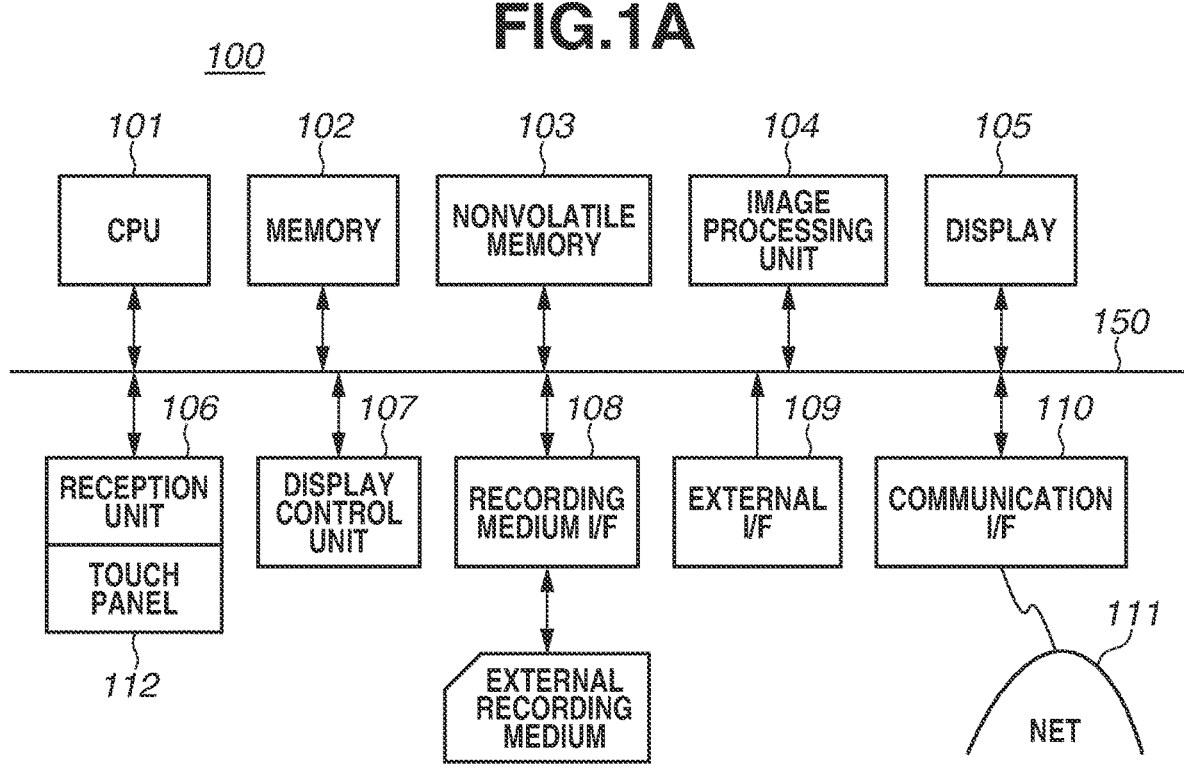
FIGS. 1A, 1B, and 1C each illustrate an electronic apparatus.

FIG. 1A illustrates a hardware configuration of an electronic apparatus 100 according to the present exemplary embodiment. The electronic apparatus 100 is, for example, a personal computer (PC). The electronic apparatus 100 is one example of an information processing apparatus. In FIG. 1, components connected to an internal bus 150 include a central processing unit (CPU) 101, a memory 102, a nonvolatile memory 103, an image processing unit 104, a display 105, a reception unit 106, a display control unit 107, a recording medium interface (I/F) 108, an external I/F 109, and a communication I/F 110. Each of the units connected to the internal bus 150 is configured to exchange data between each other via the internal bus 150.

The memory 102 includes, for example, a random access memory (RAM) (a volatile memory using a semiconductor element or the like). The CPU 101 controls each of the units of the electronic apparatus 100 with use of the memory 102 as a work memory according to a program stored in, for example, the nonvolatile memory 103. The nonvolatile memory 103 stores therein image, audio data and other data, various kinds of programs used for the CPU 101 to operate. The nonvolatile memory 103 includes, for example, a hard disk (HD) and/or a read only memory (ROM). Functions and processing of the electronic apparatus 100 that will be described below are realized by the CPU 101 reading out the program stored in the nonvolatile memory 103 and executing this program.

The image processing unit 104 performs various kinds of image processing on the image data stored in the nonvolatile memory 103 or a recording medium, a video signal acquired via the external I/F 109, image data acquired via the communication I/F 110 and the like under control of the CPU 101. The image processing performed by the image processing unit 104 includes analog-to-digital (A/D) conversion processing, digital-to-analog (D/A) conversion processing, processing for encoding the image data, compression processing, decoding processing, enlargement/reduction processing (resizing), noise reduction processing, color conversion processing, and the like.

The display 105 displays, for example, a graphical user interface (GUI) screen that forms an image and a GUI under control of the display control unit 107. The CPU 101 generates a display control signal according to the program, thereby controlling each of the units of the electronic apparatus 100 so as to generate a video signal to be displayed on the display 105 and output it to the display 105. The electronic apparatus 100 may be configured to include components only up to an interface for outputting the video signal to be displayed on the display 105, and use an external monitor (a television or the like) as the display 105.

The reception unit 106 is a device that receives a character input by a user, such as a keyboard, a microphone, a touch panel, and a mouse. The recording medium I/F 108 is configured in such a manner that a recording medium, such as a memory card, a compact disk (CD), and a digital versatile disk (DVD), can be attached thereto, and reads out data from the attached recording medium and writes data into the recording medium under control of the CPU 101. The external I/F 109 is an interface for connecting to an external apparatus via a wired cable or wirelessly and inputting/outputting the video signal and an audio signal. The communication I/F 110 is an interface for communicating with the external apparatus, the Internet 111, and the like, and transmitting/receiving various kinds of data, such as a file and a command.

Figure 1B:
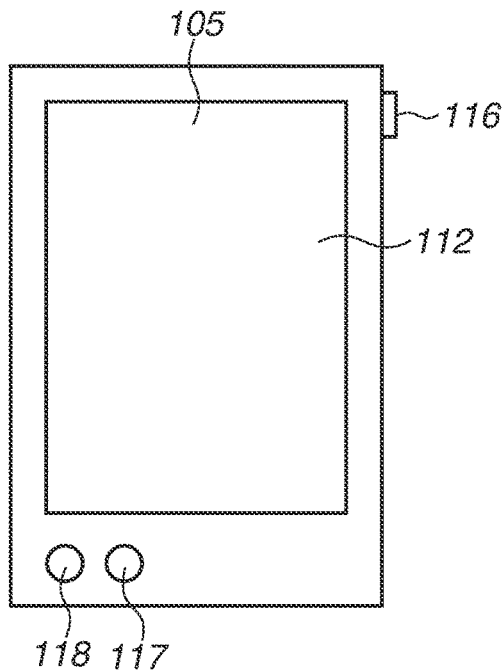
Figure 1C:
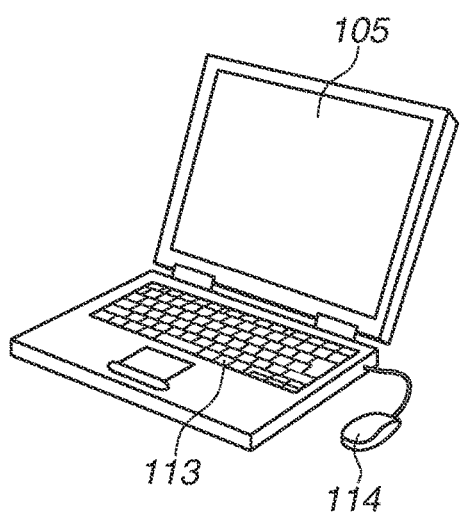

FIGS. 1B and 1C each illustrate an outer appearance of one example of the electronic apparatus 100 according to the present exemplary embodiment. FIG. 1B illustrates a smart-phone 100, which includes a touch panel 112, a power source 116, a home button 117, and a menu button 118. Pressing the power source 116 allows the smart-phone 100 to be switched between power-on and power-off. Further, pressing the home button 117 allows the smart-phone 100 to transition to a home screen where various functions can be called. Depending on a way of pressing the menu button 118, a screen can be displayed where detailed settings regarding the smart-phone 100 can be made.

The electronic apparatus 100 includes the torch panel 112 that detects a touch onto the display 105 as one of operation units. The touch panel 112 and the display 105 can be configured integrally with each other. For example, the touch panel 112 is configured in such a manner that a light transmittance thereof does not disturb the display on the display 105, and the panel 112 is mounted on an upper layer of a display surface of the display 105. Then, an input coordinate on the touch panel 112 and a display coordinate on the display 105 are associated with each other. Thus, a GUI can be configured such that it looks like as if the user can directly operate a screen displayed on the display 105. The CPU 101 can detect the following operations onto the touch panel 112, or states of the touch panel 112.

A finger or a pen that has been out of touch with the touch panel 112 newly touches the touch panel 112. In other words, the touch is started (hereinafter referred to as a Touch-Down).

The touch panel 112 is in a state touched by the finger or the pen (hereinafter referred to as a Touch-On).

The finger or the pen is moved while in touch with the touch panel 112 (hereinafter referred to as a Touch-Move).

The finger or the pen that has been in touch with the touch panel 112 is separated from the touch panel 112. In other words, the touch is ended (hereinafter referred to as a Touch-Up).

The touch panel 112 is touched by nothing (hereinafter referred to as a Touch-Off).

When the Touch-Down is detected, an input of the Touch-On is detected at the same time. After the Touch-Down, the detection of the Touch-On normally continues unless the Touch-Up is detected. The Touch-On is also detected when the Touch-Move is detected. Even when the Touch-On is detected, the Touch-Move is not detected unless a touched position is being moved. After detecting the Touch-Up of all of the finger(s) or the pen(s) that has/have been in touch with the touch panel 112, the touch panel 112 transitions to the Touch-Off.

The CPU 101 is notified of the above operations/states and a coordinate of the position touched by the finger or the pen on the touch panel 112 via the internal bus 150, and determines what kind of operation is performed on the touch panel 112 based on the information that the CPU 101 is notified of. Regarding the Touch-Move, the CPU 101 can also determine a movement direction of the finger or the pen moving on the touch panel 112 based on a change in the position coordinate of a vertical component and a horizontal component on the touch panel 112. Further, a stroke is made when the Touch-Up is performed after certain Touch-Move is performed subsequent to the Touch-Down on the touch panel 112. An operation of quickly making the stroke will be referred to as a flick. The flick is an operation of quickly moving the finger only by a certain distance while keeping the finger in touch with the touch panel 112, and separating the finger from the touch panel 112 directly therefrom. In other words, the flick is an operation of rapidly sliding the finger on the touch panel 112 just like flicking the touch panel 112 with the finger. The CPU 101 can determine that the flick has been performed when detecting that the Touch-Move has been performed by a predetermined distance or longer at a predetermined speed or higher and detecting the Touch-Up directly therefrom. Further, it is determined that a drag has been performed when it is detected that the Touch-Move has been performed by a predetermined distance or longer at a lower speed than a predetermined speed. The touch panel 112 can be realized by employing any type of touch panels using various methods, such as a resistive film method, a capacitive method, a surface elastic wave method, an infrared method, an electromagnetic induction method, an image recognition method, and an optical sensor method. As other methods, the touch panel 112 may detect that the touch is input judging from presence of a touch on the touch panel 112 or judging from presence of an approach of the finger or the pen to the touch panel 112. The touch panel 112 can work in any of these methods.

FIG. 1C illustrates a PC. The PC 100 includes the display 105, a keyboard 113, and a mouse 114. The user can issue various instructions, such as an input of a character and an input of a number, by an operation onto the keyboard 113. Further, the user can move a cursor presented on the display 105 to select/move an item presented on the display 105 by operating the mouse 114.

Figure 2A:
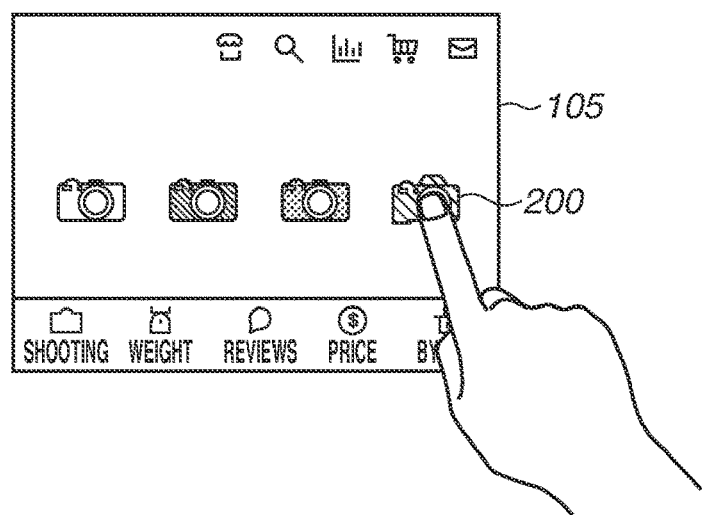
FIGS. 2A to 2F illustrate a user operation.

FIGS. 2A to 2F illustrate a user operation when processing for removing a candidate item is performed. FIGS. 2A to 2F illustrate a transition of a screen displayed on the display 105 when the user operation for removing the candidate item is performed. FIG. 2A illustrates the display 105 presenting thereon a plurality of candidate items placed in a shopping cart by the user. If a candidate item 200 is to be removed from the shopping cart in this state, the user selects the candidate item 200 and moves it to a trash bin icon 210 (a NEGATIVE item). When the candidate item 200 is moved to the trash bin icon 210, the CPU 101 receives a removal instruction and performs processing for removing the candidate item 200 from the shopping cart.

Figure 2B:
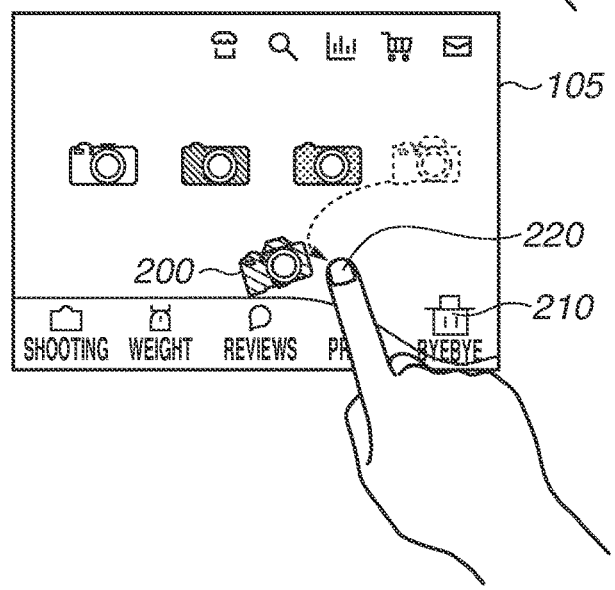
Figure 2C:
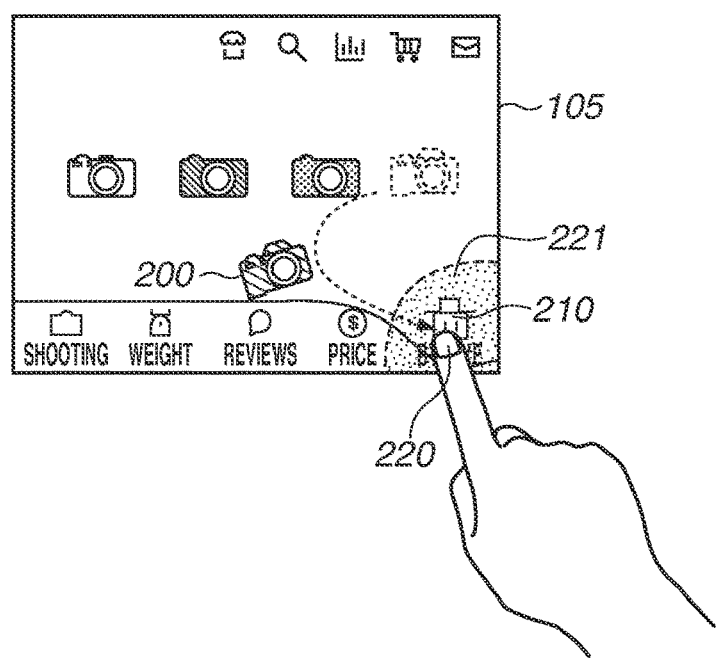

More specifically, the user first performs the Touch-Down operation on the selectable candidate item 200, and starts the Touch-Move operation toward the NEGATIVE item displayed on a lower right side of the display 105 after that. In this case, the CPU 101 causes the candidate item 200 to be displayed in such a manner that the candidate item 200 is moved according to the Touch-Move operation as illustrated in FIG. 2B. The CPU 101 performs control in such a manner that the candidate item 200 is moved toward the NEGATIVE item while keeping a time lag behind the movement of the position of the user's finger (a manipulator) in the Touch-Move operation. Hereinafter, the position of the user's finger in the Touch-Move operation will be referred to as a touch point. At this time, the candidate item 200 is located on an opposite side from a direction where the NEGATIVE item is located as viewed from a touch point 220. The Touch-Move operation continues, and the touch point 220 reaches a display position of the NEGATIVE item as illustrated in FIG. 2C. Thus, the display position of the NEGATIVE item can be specified by the touch point 220. Since the candidate item 200 is moved while keeping the time lag behind the movement of the Touch-Move operation, the candidate item 200 is still located between a display position where the candidate item 200 starts to be moved and the display position of the NEGATIVE item, at this point in time.

Figure 2D:
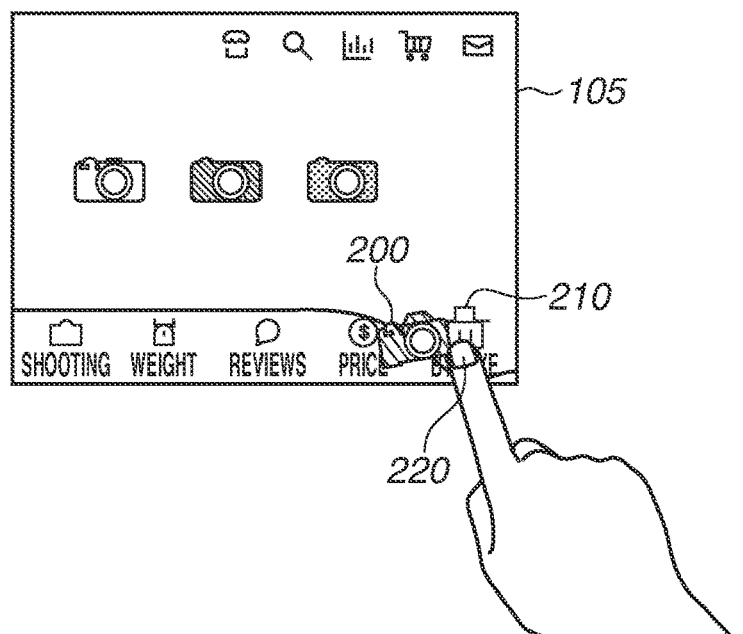
Figure 2E:
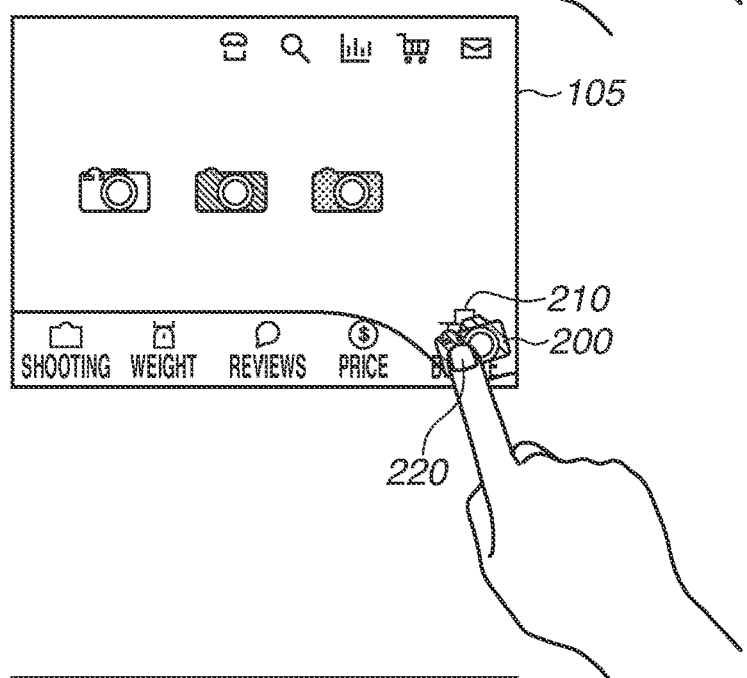
Figure 2F:
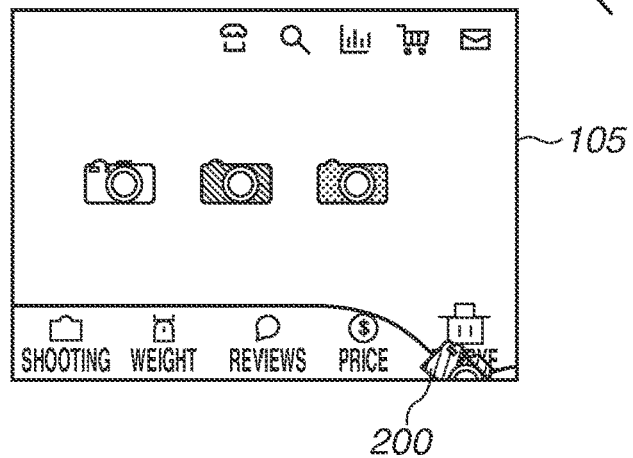

When the user still continues the touch operations at the display position of the NEGATIVE item, the candidate item 200 continues the movement following the Touch-Move operation as illustrated in FIG. 2D. Then, the candidate item 200 reaches the display position of the NEGATIVE item with the time lag behind the Touch-Move operation as illustrated in FIG. 2E. When the candidate item 200 reaches the display position of the NEGATIVE item, the CPU 101 performs the processing for removing the NEGATIVE item. The CPU 101 further performs control so as to present such a display that the NEGATIVE item disappears from the display 105 as illustrated in FIG. 2F. Owing to this display, the user becomes aware that the processing for removing the candidate item 200 is performed.

Suppose that the Touch-Up operation is performed at a timing before the candidate item 200 reaches the display position of the NEGATIVE item as illustrated in FIGS. 2B to 2D. In this case, the CPU 101 performs control in such a manner that the processing for removing the candidate item 200 is not performed, and performs control in such a manner that the display 105 returns to the state illustrated in FIG. 2A.

Figure 3A:
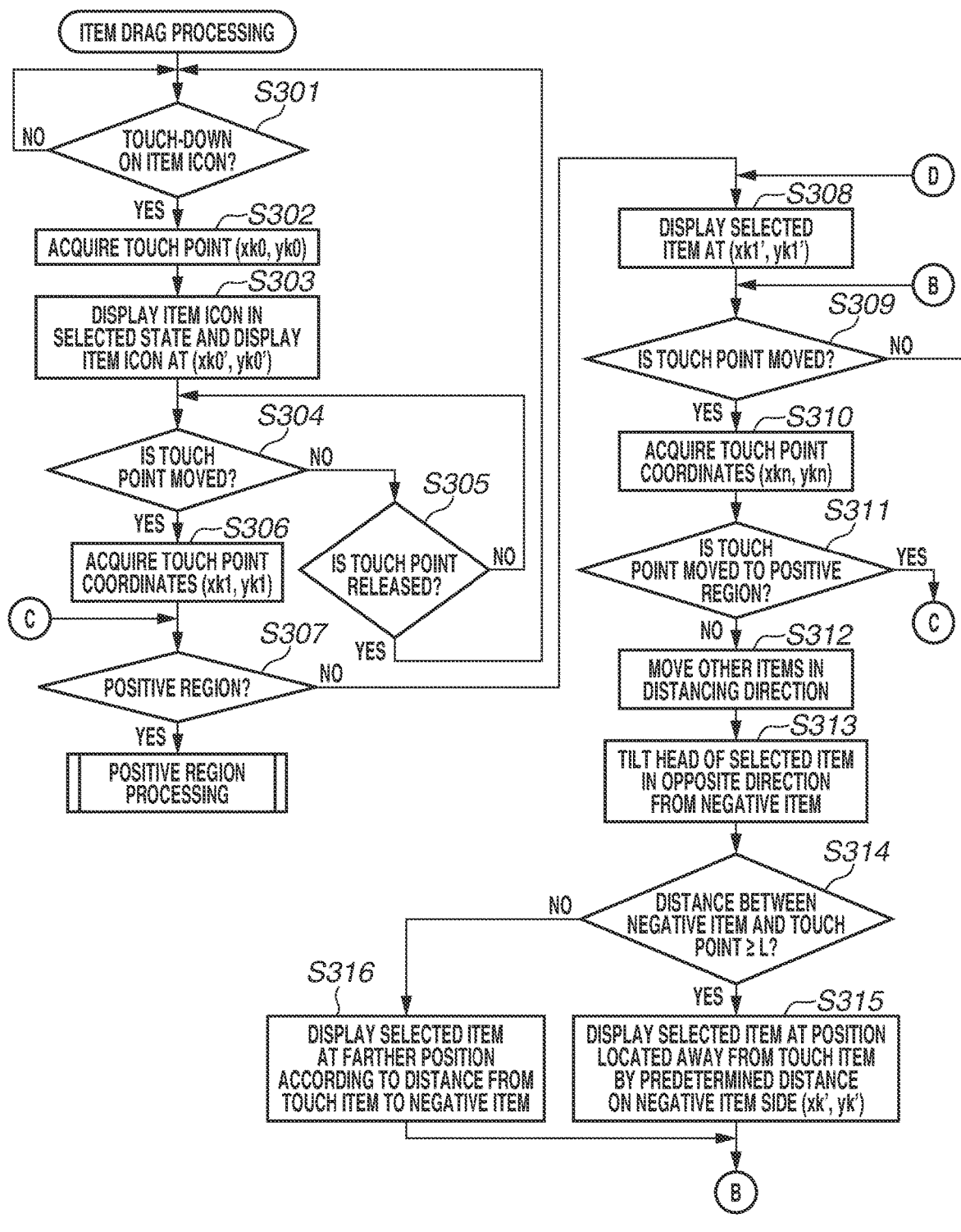
FIG. 3A and FIG. 3B, is a flowchart illustrating removal control processing.
Figure 3B:
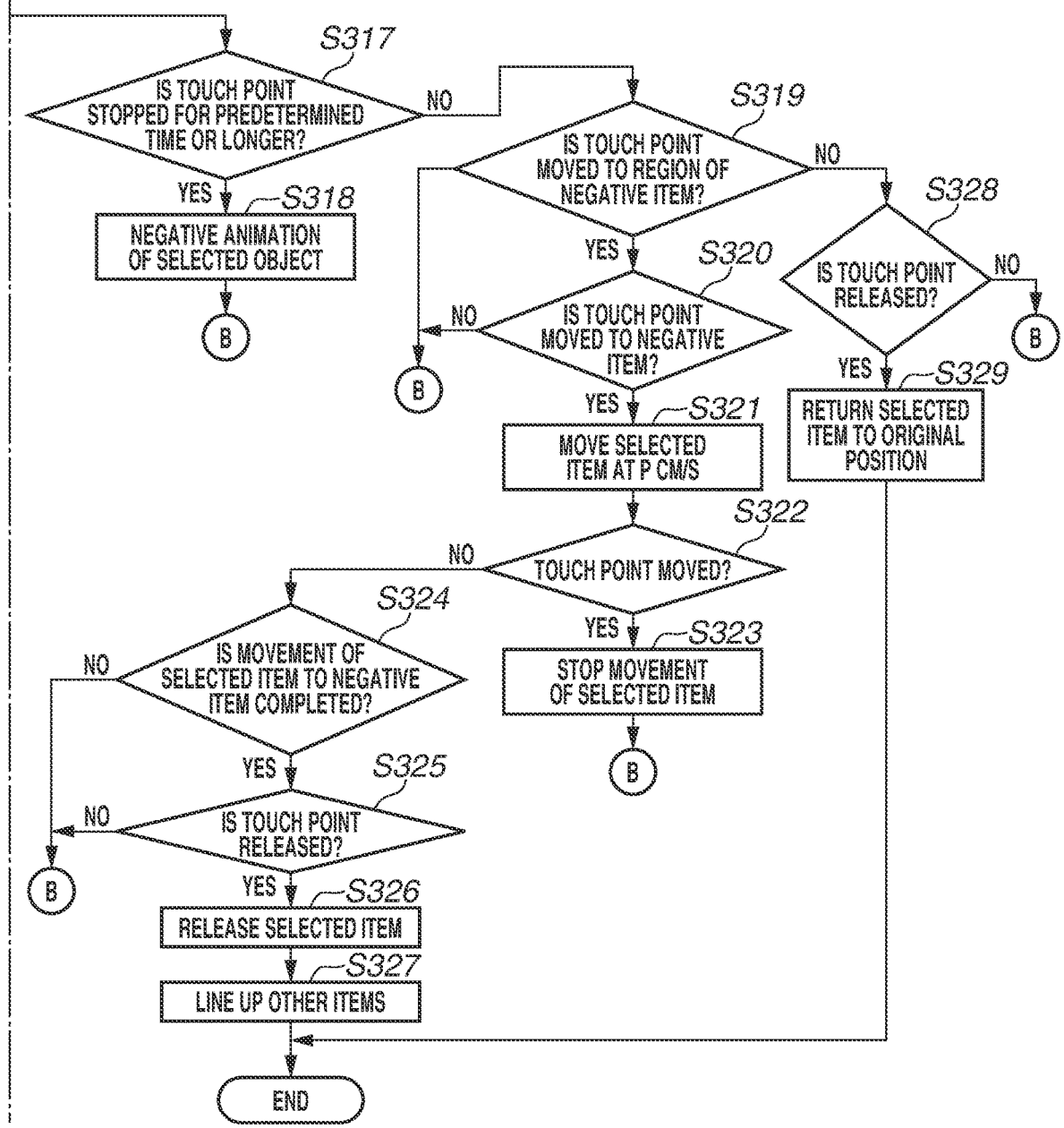

FIG. 3 is a flowchart illustrating the removal control processing corresponding to the user operation described with reference to FIGS. 2A to 2F. In step S301, the CPU 101 determines whether the Touch-Down is performed onto an icon item. If the Touch-Down operation is performed (YES in step S301), the processing proceeds to step S302. Hereinafter, the candidate item selected by the Touch-Down operation will be referred to as a selected item. Further, a display position of the selected item before the item is selected, like the example illustrated in FIG. 2A, will be referred to as an initial position. In step S302, the CPU 101 acquires a position on the screen that is pointed by the user as the touch point, and sets (xk0, yk0) as its coordinates. Next, in step S303, the CPU 101 changes the display of the selected item in such a manner that the selected item is brought into a selected state, and displays the selected item at a position (xk0', yk0') slightly offset from the touch point acquired in step S302. More specifically, the CPU 101 adds an edge and/or a shadow to the selected item, and displays the selected item at a position slightly above the touch point.

Next, in step S304, the CPU 101 determines whether an operation of moving the touch point (the Touch-Move operation) has been performed. If the operation of moving the touch point has been performed (YES in step S304), the processing proceeds to step S306. If the operation of moving the touch point has not been performed (NO in step S304), the processing proceeds to step S305. In step S305, the CPU 101 determines whether an operation of releasing the touch point has been performed. Here, the operation of releasing the touch point is the Touch-Up operation. If the release operation has been performed (YES in step S305), the processing proceeds to step S301. If the release operation has not been performed (NO in step S305), the processing proceeds to step S304.

In step S306, the CPU 101 acquires coordinates of the touch point, and sets (xk1, yk1) as the coordinates. Next, in step S307, the CPU 101 determines whether the touch point is located in a POSITIVE region. The POSITIVE region refers to a region where purchase items are situated and is located on an upper side relative to the position where the item is displayed, in a region on the display 105. If it is determined that the touch point has been moved to the POSITIVE region (YES in step S307), the present processing transitions to POSITIVE region processing. If not (NO in step S307), the processing proceeds to step S308.

Step S308 and steps subsequent thereto are processing performed when the touch point is moved to a NEGATIVE region. In other words, step S308 and the steps subsequent thereto are processing when the touch point is moved to a region where the removal item is situated, which is different from the POSITIVE region and is located on a lower side relative to the selected item, on the display 105.

In step S308, the CPU 101 displays the selected item at (xk1', yk1'). In other words, the CPU 101 displays the selected item at a position slightly shifted from the touch point. In step S309, the CPU 101 determines whether the cursor has been moved. If the cursor has been moved (YES in step S309), in step S310, the CPU 101 acquires coordinates of the cursor and sets (xkn, ykn) as the coordinates. If the CPU 101 determines that the touch point has been moved to the POSITIVE region in step S311 (YES in step S311), the processing proceeds to step S307. If not (NO in step S311), in step S312, the CPU 101 performs control in such a manner that the other items (the items other than the selected item) are moved in a departing direction. In step S313, the CPU 101 tilts a head, i.e., a top side of the selected item in a direction opposite to the NEGATIVE item (the removal item). Owing to this display, the CPU 101 can present the display as if the selected item anthropomorphically does not wish to be removed. In step S314, the CPU 101 determines whether a point distance, which is a distance between the NEGATIVE item and the touch point, is equal to or longer than a distance threshold value L. The distance threshold value L is a predetermined distance. If the point distance is equal to or longer than the distance threshold value L (YES in step S314), the processing proceeds to step S315. If the point distance is shorter than the distance threshold value L (NO in step S314), the processing proceeds to step S316.

In step S315, the CPU 101 performs control in such a manner that the selected item is moved to and displayed at a position between the initial position and the touch point so that the selected item is moved while keeping the time lag behind the touch point. After that, the processing proceeds to step S309. In step S315, the CPU 101 displays the selected item at a position (xk', yk') located away from the touch point by a predetermined distance, on the NEGATIVE item side. The position (xk', yk') in step S315 is illustrated in FIG. 6, In step S316, the CPU 101 performs control in such a manner that the selected item is moved to and displayed at a position corresponding to the point distance and located between the initial position and the touch point. After that, the processing proceeds to step S309. In step S316, the CPU 101 displays the selected item at a more distant position (xk', yk') corresponding to the distance from the touch point to the NEGATIVE item. The position (xk', yk') in step S316 is illustrated in FIG. 6.

In step S317, the CPU 101 determines whether the touch point is stopped for a predetermined time or longer. If the touch point is stopped for the predetermined time or longer (YES in step S317), in step S318, the CPU 101 presents a NEGATIVE animation of the selected item. The predetermined time in step S317 is three seconds or five seconds, and the NEGATIVE animation refers to such an animation of the item anthropomorphically indicating to the user that it wishes to go away from the removal item by moving in the direction away from the removal item or returning to the original position.

In step S319, the CPU 101 determines whether the touch point has been moved to a region of the NEGATIVE item. The region of the NEGATIVE item refers to a region 221 illustrated in FIG. 2C. If it is determined that the touch point has been moved to the region of the NEGATIVE item (YES in step S319), the processing proceeds to step S320. In step S320, the CPU 101 determines whether the touch point has been moved to the NEGATIVE item. In other words, the CPU 101 determines whether the touch point 220 has been moved to the position of the item 210 as illustrated in FIG. 2C. If the touch point has been moved to the NEGATIVE item (YES in step S320), the processing proceeds to step S321.

In step S321, the CPU 101 controls the display in such a manner that the selected item is moved toward the NEGATIVE item at a constant speed P cm/s. When the processing proceeds to step S321 for the first time, the selected item and the touch point are located a distance 1 away from each other. Therefore, since P is also constant, the selected item is moved to the NEGATIVE item after a predetermined time has elapsed since the touch point is mowed to the NEGATIVE item in step S320.

In step S322, the CPU 101 determines whether the touch point has performed the MOVE. If the Touch-Move has been performed (YES in step S322), in step S323, the CPU 101 stops the movement of the selected item which has been moved in step S321. Due to this control, the user can stop the execution of the removal. In this manner, the user can stop the execution of the removal function by moving the touch position while the item is being moved. Examples of the NEGATIVE item include such functions by which it is difficult or impossible to return the selected item to an original state once the function is exercised, such as initialization and a transfer, in addition to the removal.

In step S324, the CPU 101 determines whether the selected item has reached the NEGATIVE item. If the selected item has reached the NEGATIVE item (YES in step S324), the processing proceeds to step S325. In step S325, the CPU 101 determines whether the touch point has been released. If the touch point has been released (YES in step S325), in step S326, the CPU 101 removes the selected item. Further, in step S327, the CPU 101 performs control in such a manner that the items other than the selected item (the items moved to an edge in step S312 when the selected item is selected) are lined up on the display 105 and displayed at a center. Through the processing in steps S320, S321, and S324, the selected item is displayed so as to reach the NEGATIVE item after the predetermined time has elapsed since the movement operation is performed. These procedures are one example of display control processing. Further, the processing in step S326 is one example of processing execution for performing the processing associated with the NEGATIVE item. In step S328, the CPU 101 determines whether the cursor has been released. If the cursor has been released (YES in step S328), the CPU 101 displays the selected item at the original display position.

Thus, the selected item is moved to the item after the touch point has reached the item corresponding to the function, so that the user can execute the function by waiting for the movement of the selected item. At this time, since the time is displayed, the user who wants to execute the function, may feel like he is just standing by. However, the electronic apparatus 100 gradually moves the item of the function to be executed, so that the user naturally feels that the function will be executed in just a little while, and thus improving operability. Further, the electronic apparatus 100 allows the user to stop the execution of the function only by moving the touch position, thereby also eliminating a possibility that unintended processing is performed along the way. Further, the electronic apparatus 100 moves the selected item to the item representing the function, thereby facilitating confirmation of the function to be executed and the target thereof. Further, the electronic apparatus 100 displays neither an additional item nor a confirmation screen, so that visibility of the other displayed items is not impaired on the display 105. Therefore, even without a special display, the user can intuitively understand that the touch operation continues until the selected item reaches the NEGATIVE item to perform the processing corresponding to the NEGATIVE item (the removal processing). Further, since the selected item is moved while keeping the time lag behind the touch point, the user can confirm whether the processing corresponding to the NEGATIVE item (the removal processing) matches the user's intention until the selected item reaches the NEGATIVE item.

On the other hand, in step S329, the CPU 101 controls the display in such a manner that the selected item returns to the initial position. After that, the processing proceeds to step S301. In this manner, the CPU 101 performs control in such a manner that the processing associated with the NEGATIVE item is not performed if the Touch-UP is performed before the selected item reaches the NEGATIVE item. Owing to this control, the user can cancel the instruction to perform the processing if it is determined that the processing corresponding to the NEGATIVE item (the removal processing) does not match the user's intention, until the selected item reaches the NEGATIVE item.

Thus, the electronic apparatus 100 according to the present exemplary embodiment does not cause an increase in the number of operations. Further, since the electronic apparatus 100 does not require the user to be aware in advance that a predetermined operation should be performed, operation instructions do not need to be presented in words, which is advantageous for an apparatus intended to be used in regions using different languages. In this manner, the electronic apparatus 100 allows the user to easily input the instruction for causing the electronic apparatus 100 to perform the processing desired by the user. As a result, the electronic apparatus 100 can improve the operability of the information processing apparatus as the electronic apparatus 100.

Further, the selected item is moved at the constant speed until the selected item reaches the display position of the NEGATIVE item after the touch point reaches the position of the icon representing the function. Therefore, the user can be aware of the time in which the touch should continue until the processing (function) thereof is performed, without viewing a special display. This is advantageous in an apparatus which display area is limited.

Figure 4A:
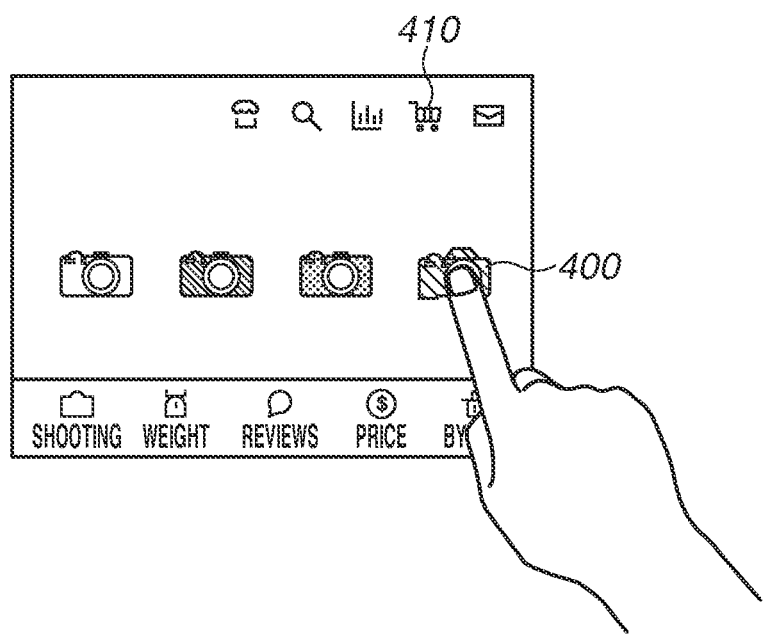
FIGS. 4A to 4E illustrate a user operation.

Next, purchase processing for placing the candidate item into a cart to purchase it (POSITIVE region processing) will be described. FIGS. 4A to 4D illustrate a user operation when the POSITIVE region processing is performed. FIGS. 4A to 4D illustrate a transition of a screen presented on the display 105 when the user operation for a purchase process is performed. FIG. 4A illustrates the display 105 presenting thereon a plurality of candidate items representing products. If the user wants to purchase a candidate item 400 in this state, he selects the candidate item 400 and moves it to a cart icon 410. When the candidate item 400 is moved to the cart icon 410, the CPU 101 accepts a purchase instruction and performs processing for purchasing the candidate item 400.

Figure 4B:
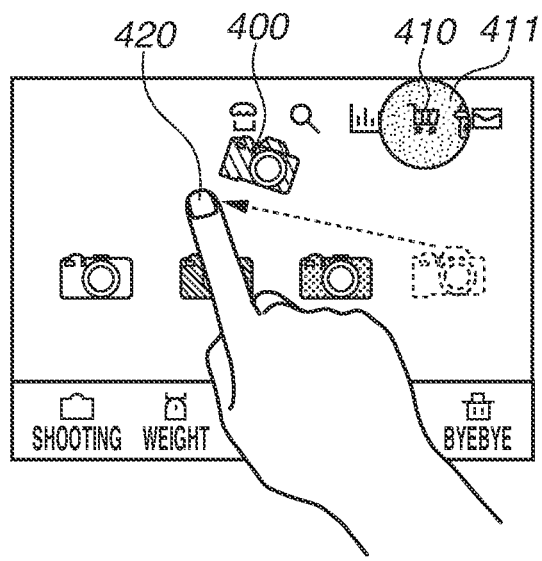
Figure 4C:
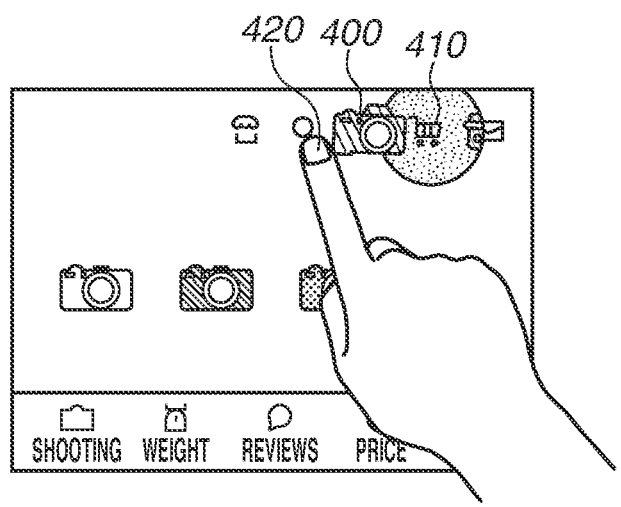

More specifically, the user first performs the Touch-Down operation on the candidate item 400, then starts the Touch-Move operation toward the cart icon 410 displayed on an upper right side on the display 105. In this case, the CPU 101 causes the candidate item 400 to be displayed in such a manner that the candidate item 400 moves according to the Touch-Move operation as illustrated in FIG. 4B. The CPU 101 performs control in such a manner that the candidate item 400 moves toward the cart icon 410 temporally prior to the movement in the Touch-Move operation. In FIG. 4C, the cart icon 410 is located closer to the candidate item 400. Also at this time, the display position of the touch point 420 is located at a position closer to a display position of the cart icon 410 than the touch point 420.

Figure 4D:
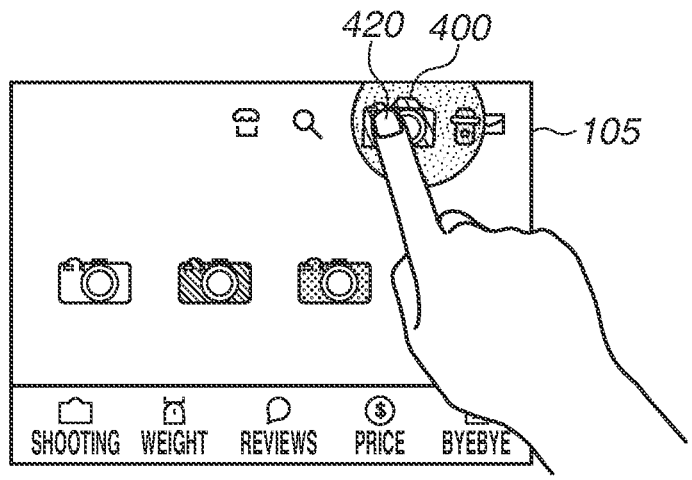
Figure 4E:
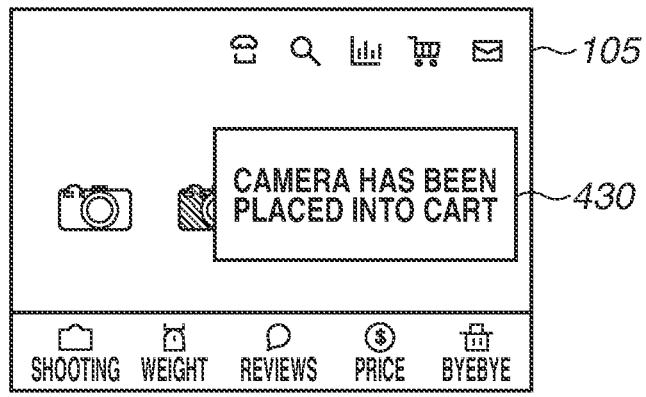

After that, the touch point 420 reaches the display position of the cart icon 410 with a time lag behind the candidate item 400 as illustrated in FIG. 4D. When the touch point 420 reaches the display position of the cart icon 410, the CPU 101 performs processing corresponding to the cart icon 410 (the purchase processing). The CPU 101 further performs control so as to display a message 430 indicating that the processing for purchasing the product has been performed as illustrated in FIG. 4E at this time.

Figure 5B:
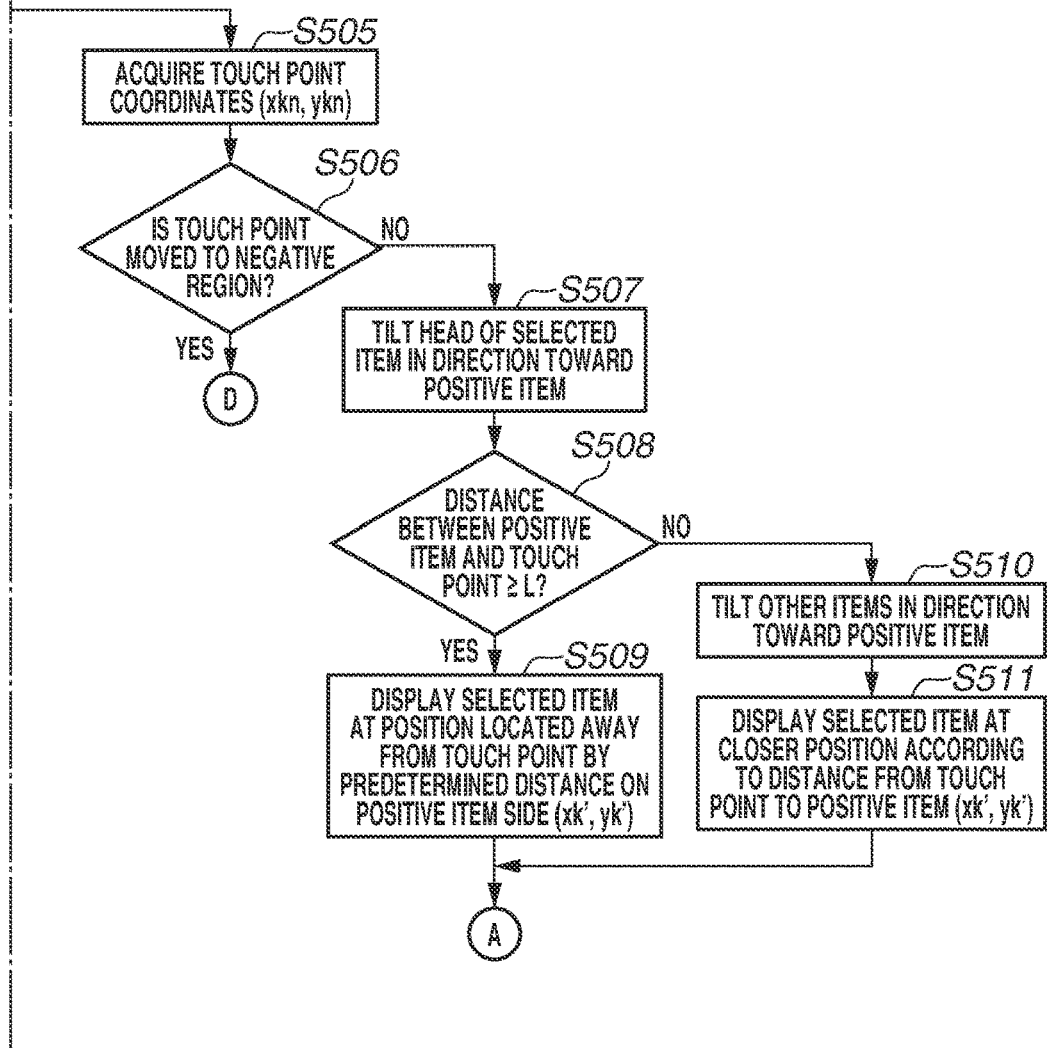

FIG. 5 is a flowchart illustrating the POSITIVE region processing corresponding to the user operation described with reference to FIGS. 4A to 4D. Step S501 is similar to step S308. In step S502, the CPU 101 expands a purchase item region. In step S503, the CPU 101 displays an already purchased item in the purchase item expanded region. In step S504, the CPU 101 determines whether the touch point has been moved. If the touch point has been moved (YES in step S504), in step S505, the CPU 101 acquires the coordinates of the cursor. Then, the processing proceeds to step S506. In step S506, the CPU 101 determines whether the touch point has been moved to the NEGATIVE region. If the touch point has been moved to the NEGATIVE region (YES in step S506), the processing proceeds to step S308. If the touch point has not been moved to the NEGATIVE region (NO in step S506), in step S507, the CPU 101 tilts the head, i.e., the top side of the selected item in a direction toward the POSITIVE item. Owing to this display, the CPU 101 can present the display to the user as if the selected item anthropomorphically wants to move toward the POSITIVE item side. In step S508, the CPU 101 determines whether a point distance, which is a distance between the cart icon and the touch point, is equal to or longer than the distance threshold value L. The distance threshold value L is a predetermined distance. If the point distance is equal to or longer than the distance threshold value L (YES in step S508), the processing proceeds to step S509. If the point distance is shorter than the distance threshold value L (NO in step S508), the processing proceeds to step S510.

In step S509, the CPU 101 performs control in such a manner that the selected item is moved to and displayed at a position between the display positions of the touch point and the cart icon so that the selected item is moved prior to the touch point. After that, the processing proceeds to step S504. In other words, the CPU 101 performs control in such a manner that the selected item is displayed at a position (xk', yk') located away from the touch point by a predetermined distance on the POSITIVE item side. The position (xk', yk') in step S509 is illustrated in FIG. 6. The CPU 101 may perform control in such a manner that the selected item is displayed so as to be moved at a higher speed than the touch point so that the selected item is moved prior to the touch point. In step S511, the CPU 101 performs control in such a manner that the selected item is moved to and displayed at a position corresponding to the point distance and located between the display positions of the touch point and the cart icon. After that, the processing proceeds to step S504. In other words, the CPU 101 performs control in such a manner that the selected item is displayed at a closer position (xk', yk') according to the distance from the touch point to the POSITIVE item. The position (xk', yk') in step S511 is illustrated in FIG. 6.

In step S512, the CPU 101 determines whether the touch point is stopped for a predetermined time or longer. If the touch point is stopped for the predetermined time or longer (YES in step S512), in step S513, the CPU 101 presents a POSITIVE animation of the selected item. The predetermined time in step S512 is three seconds or five seconds, and the POSITIVE animation refers to such an animation that the item anthropomorphically indicates to the user that it wants to approach the purchase item by moving in the direction toward the purchase item or returning to the original position.

In step S514, the CPU 101 determines whether the touch point has been moved to a region of the POSITIVE item. The region of the POSITIVE item refers to a region 411 illustrated in FIG. 4B. In other words, the CPU 101 determines whether the touch point 420 has been moved to the position of the item 410 as illustrated in FIG. 4D. If the touch point has been moved to the region of the POSITIVE item (YES in step S514), the processing proceeds to step S515. In step S515, the CPU 101 determines whether the touch point is released (the Touch-Up is performed). If the touch point is released (YES in step S515), the processing proceeds to step S516. In step S516, the CPU 101 displays the selected object after correcting the orientation of the selected object from the tilted state in step S507 to a straight state. In step S517, the CPU 101 displays an already-selected animation. The already-selected animation is an animation in which items already moved to the POSITIVE region and to be purchased are lined up and horizontally sway in the same direction at the same time. The animation is used to anthropomorphically indicate to the user that the items to be purchased are delighting. In step S518, the CPU 101 displays the items other than the selected item, i.e., items 402 to 404 while being lined up at the center of the display 105. Further, in step S519, the CPU 101 displays a message indicating that the processing for purchasing the product has been performed, and the purchase control processing is completed. In step S520, the CPU 101 determines whether the cursor is released. If the cursor is released (YES in step S520), in step S521, the CPU 101 returns the selected item to the original position.

Thus, the electronic apparatus 100 causes the camera icon to reach the cart icon before the touch point reaches the cart icon. Therefore, the electronic apparatus 100 can make the user aware that the processing will be performed before the execution of the processing is started without presenting a special display.

Further, as another example, the CPU 101 may perform control in such a manner that the cart icon 410 and an image in a neighborhood thereof are displayed in an enlarged manner when the touch point starts to move toward the cart icon 410. This display allows the user to easily grasp the processing (the function) with respect to the cart icon 410.

Further, as another example, the processing with respect to the candidate item is not limited to the exemplary embodiment, and may be processing such as initialization and transmission.

In the above-described exemplary embodiment, the electronic apparatus 100 has been described and the touch operation onto the touch panel 112 is taken as the user operation. However, the user operation may also be input by moving the cursor besides the touch operation. For example, the item may be selected by an operation of moving the cursor to the position of the item and clicking it, and the touch point may be moved by moving the mouse to shift the cursor while clicking the item. Further, the touch point may be released by a release of the click.

Thus, without presenting a special display, the electronic apparatus 100 can prevent the user from performing an erroneous operation or making an improper determination regarding a function that requires the user to cautiously make a determination when executing it and can also prompt the user to execute a recommended function.

Regarding the above-described various control that the electronic apparatus 100 performs, a single hardware device may perform the control, or a plurality of hardware devices may control the entire apparatus 100 by sharing the processing among them.

Further, the present invention has been described in detail based on the representative exemplary embodiments. However, the present invention is not limited to these specific exemplary embodiments, and includes various embodiments within a range that does not depart from the spirit of the present disclosure. Further, each of the above-described exemplary embodiments is merely one exemplary embodiment of the present invention, and each of the exemplary embodiments can also be combined as appropriate.

Further, in the above-described exemplary embodiments, the present invention has been described referring to the example applied to the electronic apparatus 100, but is not limited to this example and can be applied to any apparatus including a display screen. For example, embodiments of the present invention can be applied to a personal computer and a personal digital assistant (PDA), a mobile phone terminal and a mobile image viewer, a printer apparatus including a display, a digital photo frame, a music player, a game machine, and an electronic book reader. Further, embodiments of the present invention can be applied to a tablet terminal, a smart-phone, home electronics and an in-vehicle apparatus including a display, and the like.

Other Exemplary Embodiments

Embodiments of the present invention can also be embodied by processing that supplies a program capable of realizing one or more function(s) of the above-described exemplary embodiments to a system or an apparatus via a network or a storage medium, and causes one or more processor(s) in a computer of the system or apparatus to read out and execute the program. Further, embodiments of the present invention can also be embodied by a circuit (for example, an application specific integrated circuit (ASIC)) capable of realizing one or more function(s).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-002605, filed Jan. 11, 2018 and No. 2018-003484, filed Jan. 12, 2018, which are hereby incorporated by reference herein in their entirety.

What is claimed is:

1. An electronic apparatus comprising:
   one or more processors; and
   a memory storing one or more programs including executable instructions which, when executed by the one or more processors, cause the electronic apparatus to:
   display a movable item on a screen of a display unit;
   detect an instruction for designating a position on the screen in response to a user operation;
   detect movement of the designated position on the screen;
   if a function corresponding to a first destination area in a first direction toward which the movement of the designated position is heading is a first type:
   perform control to move the displayed movable item on the screen in such a manner that the displayed movable item reaches the first destination area later than the designated position reaches the first destination area according to the detection of the movement of the designated position; and
   perform the function corresponding to the first destination area after both the designated position and the displayed movable item reach the first destination area; and
   if a function corresponding to a second destination area in a second direction toward which the movement of the designated position is heading is a second type, wherein the second direction is distinct from the first direction:
   perform control to move the displayed movable item on the screen in such a manner that the displayed movable item reaches the second destination area earlier than the designated position reaches the second destination area according to the detection of the movement of the designated position; and perform the function corresponding to the second destination area after both the displayed movable item and the designated position reach the second destination area,
wherein the first type is different from the second type.

2. The electronic apparatus according to claim 1, wherein, if the movement of the designated position is in the first direction toward the first destination area, the displayed movable item is controlled to move toward the first destination area at a predetermined constant speed after the designated position reaches the first destination area.

3. The electronic apparatus according to claim 1, wherein, if the movement of the designated position is in the first direction toward the first destination area, the displayed movable item is controlled to move toward the first destination area in such a manner that the displayed movable item is farther away from the first destination area than the designated position.

4. The electronic apparatus according to claim 1, wherein the function corresponding to the first destination area is not performed if the designated position no longer exists in the first destination area before the displayed movable item reaches the first destination area.

5. The electronic apparatus according to claim 1, wherein the first type of the function corresponding to the first destination area includes initialization, removal, or transmission, and
wherein the second type of the function corresponding to the second destination area includes selection for purchase.

6. The electronic apparatus according to claim 1, wherein, if the movement of the designated position is in the second direction toward the second destination area, if the displayed movable item is controlled to reach the second destination area before the designated position reaches at the second destination area, the function corresponding to the second destination area is performed immediately after the designated position reaches the second destination area.

7. An electronic apparatus comprising:
one or more processors; and
a memory storing one or more programs including executable instructions which, when executed by the one or more processors, cause the electronic apparatus to:
display a movable item on a screen of a display unit;
detect an instruction for designating a position on the screen in response to a user operation;
detect movement of the designated position on the screen;
if a function corresponding to a first destination area in a first direction toward which the movement of the designated position is heading is a first type, perform control to move the displayed movable item toward the first destination area behind the designated position in such a manner that the displayed movable item reaches the first destination area later than the designated position reaches the first destination area according to the detection of the movement of the designated position; and
if a function corresponding to a second destination area in a second direction toward which the movement of the designated position is heading is a second type, perform control to move the displayed movable item toward the second destination area ahead of the designated position in such a manner that the displayed movable item reaches the second destination area earlier than the designated position reaches the second destination area according to the detection of the movement of the designated position, wherein the second direction is distinct from the first direction.

8. An information processing method that an electronic apparatus executes, the information processing method comprising:
displaying a movable item on a screen of a display unit;
detecting an instruction for designating a position on the screen in response to a user operation;
detecting movement of the designated position on the screen;
if a function corresponding to a first destination area in a first direction toward which the movement of the designated position is heading is a first type:
performing control to move the displayed movable item on the screen in such a manner that the displayed movable item reaches the first destination area later than the designated position reaches the first destination area according to the detection of the movement of the designated position; and
performing the function corresponding to the first destination area after both the designated position and the displayed movable item reach the first destination area; and
if a function corresponding to a second destination area in a second direction toward which the movement of the designated position is heading is a second type, wherein the second direction is distinct from the first direction:
performing control to move the displayed movable item on the screen in such a manner that the displayed movable item reaches the second destination area earlier than the designated position reaches the second destination area according to the detection of the movement of the designated position; and
performing the function corresponding to the second destination area after both the displayed movable item and the designated position reach the second destination area,
wherein the first type is different from the second type.

9. A non-transitory computer-readable storage medium storing one or more programs including executable instructions that, when executed by one or more processors of an electronic apparatus, cause the electronic apparatus to perform operations comprising:
displaying a movable item on a screen of a display unit;
detecting an instruction for designating a position on the screen in response to a user operation;
detecting movement of the designated position on the screen;
if a function corresponding to a first destination area in a first direction toward which the movement of the designated position is heading is a first type:
performing control to move the displayed movable item on the screen in such a manner that the displayed movable item reaches the first destination area later than the designated position reaches the first destination area according to the detection of the movement of the designated position; and
performing the function corresponding to the first destination area after both the designated position and the displayed movable item reach the first destination area; and
if a function corresponding to a second destination area in a second direction toward which the movement of the designated position is heading is a second type, wherein the second direction is distinct from the first direction:
   performing control to move the displayed movable item on the screen in such a manner that the displayed movable item reaches the second destination area earlier than the designated position reaches the second destination area according to the detection of the movement of the designated position; and
   performing the function corresponding to the second destination area after both the displayed movable item and the designated position reach the second destination area,
wherein the first type is different from the second type.

10. An information processing method configured to be performed by an electronic apparatus, the information processing method comprising:
   displaying a movable item on a screen of a display unit;
   detecting an instruction for designating a position on the screen in response to a user operation;
   detecting movement of the designated position on the screen;
   if a function corresponding to a first destination area in a first direction toward which the movement of the designated position is heading is a first type, performing control to move the displayed movable item toward the first destination area behind the designated position in such a manner that the displayed movable item reaches the first destination area later than the designated position reaches the first destination area according to the detection of the movement of the designated position; and
   if a function corresponding to a second destination area in a second direction toward which the movement of the designated position is heading is a second type, performing control to move the displayed movable item toward the second destination area ahead of the designated position in such a manner that the displayed movable item reaches the second destination area earlier than the designated position reaches the second destination area according to the detection of the movement of the designated position, wherein the second direction is distinct from the first direction.

11. A non-transitory computer-readable storage medium storing one or more programs including executable instructions that, when executed by one or more processors of an electronic apparatus, cause the electronic apparatus to perform operations comprising:
   displaying a movable item on a screen of a display unit;
   detecting an instruction for designating a position on the screen in response to a user operation;
   detecting movement of the designated position on the screen;
   if a function corresponding to a first destination area in a first direction toward which the movement of the designated position is heading is a first type, performing control to move the displayed movable item toward the first destination area behind the designated position in such a manner that the displayed movable item reaches the first destination area later than the designated position reaches the first destination area according to the detection of the movement of the designated position; and
   if a function corresponding to a second destination area in a second direction toward which the movement of the designated position is heading is a second type, performing control to move the displayed movable item toward the second destination area ahead of the designated position in such a manner that the displayed movable item reaches the second destination area earlier than the designated position reaches the second destination area according to the detection of the movement of the designated position, wherein the second direction is distinct from the first direction.

12. The electronic apparatus according to claim 1, wherein, if the movement of the designated position is in the second direction toward the second destination area, the displayed movable item is controlled to move toward the second destination area at a higher speed than the designated position.

13. The electronic apparatus according to claim 1, wherein, if the movement of the designated position is in the second direction toward the second destination area, the displayed movable item is controlled to move in such a manner that the displayed movable item is closer to the second destination area than the designated position before the designated position reaches the second destination area.

14. The electronic apparatus according to claim 1, wherein the second type of the function corresponding to the second destination area is not performed if the designated position does not reach the second destination area after the displayed movable item reaches the second destination area.

15. The electronic apparatus according to claim 1, wherein the first type of the function corresponding to the first type of the destination area is removing the displayed movable item and the function corresponding to the second type of the destination area is selecting the displayed movable item for purchase.

16. The electronic apparatus according to claim 7, wherein the executable instructions, when executed by the one or more processors, further cause the electronic apparatus to:
   if the function corresponding to the first destination area in the first direction toward which the movement of the designated position is heading is the first type, perform the first type of the function corresponding to the first destination area after both the designated position and the displayed movable item reach the first destination area; and
   if the function corresponding to the second destination area in the second direction toward which the movement of the designated position is heading is the second type, perform the second type of the function corresponding to the second destination area after both the displayed movable item and the designated position reach the second destination area,
wherein the first type is different from the second type.

17. The electronic apparatus according to claim 16, wherein the first type of the function corresponding to the first destination area is removing the displayed movable item and the second type of the function corresponding to the second destination area is selecting the displayed movable item for purchase.

* * * * *